United States Patent
Blackburn et al.

(10) Patent No.: US 10,699,823 B2
(45) Date of Patent: Jun. 30, 2020

(54) CABLE ASSEMBLY FOR ELECTRICAL CONNECTOR

(71) Applicant: TE CONNECTIVITY CORPORATION, Berwyn, PA (US)

(72) Inventors: Christopher William Blackburn, Bothell, WA (US); Julia Anne Lachman, York, PA (US); Christopher David Ritter, Hummelstown, PA (US); Kyle Robert Sammon, Lancaster, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 9 days.

(21) Appl. No.: 16/023,526

(22) Filed: Jun. 29, 2018

(65) Prior Publication Data

US 2020/0005966 A1    Jan. 2, 2020

(51) Int. Cl.
| H01B 11/00 | (2006.01) |
| H01B 7/02 | (2006.01) |
| H04B 3/30 | (2006.01) |
| H01R 12/59 | (2011.01) |
| H01R 13/6592 | (2011.01) |
| H01R 13/66 | (2006.01) |

(52) U.S. Cl.
CPC ............ *H01B 11/002* (2013.01); *H01B 7/02* (2013.01); *H01R 12/592* (2013.01); *H01R 13/6592* (2013.01); *H04B 3/30* (2013.01); *H01R 13/6658* (2013.01)

(58) Field of Classification Search
CPC ...... H01B 11/002; H01B 7/02; H01R 12/592; H01R 13/6592; H04B 3/30
USPC ........................................................ 174/70 R
See application file for complete search history.

(56) References Cited

U.S. PATENT DOCUMENTS

| 8,758,051 | B2 | 6/2014 | Nonen et al. | |
|---|---|---|---|---|
| 9,105,375 | B2 | 8/2015 | Sugiyama | |
| 9,608,590 | B2 | 3/2017 | Hamner et al. | |
| 2002/0164900 | A1* | 11/2002 | Youtsey | H01R 9/0527 439/578 |
| 2003/0150633 | A1* | 8/2003 | Hirakawa | H01B 11/002 174/36 |
| 2014/0051295 | A1* | 2/2014 | Westman | H01R 13/518 439/626 |
| 2014/0060882 | A1* | 3/2014 | Ellis | H01R 4/04 174/78 |
| 2018/0235094 | A1* | 8/2018 | Takeuchi | H04Q 1/02 |

* cited by examiner

*Primary Examiner* — Timothy J Thompson
*Assistant Examiner* — Michael F McAllister

(57) ABSTRACT

A cable assembly includes a cable having a cable core including a first signal conductor and a first insulator around the first signal conductor. The first signal conductor includes an exposed segment at an end of the cable extending forward of the first insulators. The cable includes a cable shield surrounding the cable core providing electrical shielding along a length of the cable and having an exposed segment proximate to the end of the cable. A conductive film is wrapped around the exposed segment of the cable shield being electrically connected to the cable shield. A cable ferrule is coupled to the end of the cable being wrapped around the conductive film and being electrically connected to the conductive film. The cable ferrule is electrically connected to the cable shield through the conductive film.

18 Claims, 5 Drawing Sheets

CABLE ASSEMBLY FOR ELECTRICAL CONNECTOR

BACKGROUND OF THE INVENTION

The subject matter herein relates generally to cable assemblies for electrical connectors.

High speed differential connectors are known and used in electrical systems, such as communication systems to transmit signals within a network. Some electrical systems utilize cable mounted electrical connectors to interconnect the various components of the system.

Signal loss and/or signal degradation is a problem in known electrical systems. For example, cross talk results from an electromagnetic coupling of the fields surrounding an active conductor or differential pair of conductors and an adjacent conductor or differential pair of conductors. The strength of the coupling generally depends on the separation between the conductors, thus, cross talk may be significant when the electrical connectors are placed in close proximity to each other.

Moreover, as speed and performance demands increase, known electrical connectors are proving to be insufficient. Additionally, there is a desire to increase the density of electrical connectors to increase throughput of the electrical system, without an appreciable increase in size of the electrical connectors, and in some cases, with a decrease in size of the electrical connectors. Such increase in density and/or reduction in size causes further strains on performance.

In order to address performance, some known systems utilize shielding to reduce interference between the contacts of the electrical connectors. However, the shielding utilized in known systems is not without disadvantages. For instance, terminating of shielding components to the cable shield of the cable is difficult. Some known systems crimp a shield element directly to the cable shield. However, crimping of the shield element to the cable shield may damage the cable shield. Additionally, the crimping may change the shape and/or relative position of the cable shield to the signal conductors, which may negatively affect the characteristics of the cable, such as the impedance of the signals.

A need remains for an electrical connector having improved cable termination and shielding to meet particular performance demands.

BRIEF DESCRIPTION OF THE INVENTION

In one embodiment, a cable assembly is provided including a cable having a cable core including a first signal conductor and a first insulator around the first signal conductor. The first signal conductor includes an exposed segment at an end of the cable extending forward of the first insulators. The cable includes a cable shield surrounding the cable core providing electrical shielding along a length of the cable and having an exposed segment proximate to the end of the cable. A conductive film is wrapped around the exposed segment of the cable shield being electrically connected to the cable shield. A cable ferrule is coupled to the end of the cable being wrapped around the conductive film and being electrically connected to the conductive film. The cable ferrule is electrically connected to the cable shield through the conductive film.

In another embodiment, a cable assembly is provided including a contact holder extending between a front and a rear having contact channels extending between the front and the rear and first and second contacts received in the corresponding channels of the contact holder each having a mating end and a terminating end. A ground shield is coupled to the contact holder and provides electrical shielding for the first and second contacts. The cable assembly includes a cable having a cable core including a first signal conductor, a second signal conductor, a first insulator around the first signal conductor and a second insulator around the second signal conductor. The first and second signal conductors include exposed segments at an end of the cable extending forward of the first and second insulators, respectively for termination to the first and second contacts. The cable includes a cable shield surrounding the cable core providing electrical shielding along a length of the cable and having an exposed segment proximate to the end of the cable. A conductive film is wrapped around the exposed segment of the cable shield being electrically connected to the cable shield. A cable ferrule is coupled to the end of the cable being wrapped around the conductive film and being electrically connected to the conductive film. The cable ferrule is electrically connected to the cable shield through the conductive film and the ground shield is electrically connected to the cable ferrule rearward of the contact holder.

In a further embodiment, an electrical connector is provided including a housing having a front and a rear and a plurality of cable assemblies coupled to the housing and extending from the rear of the housing. Each cable assembly includes a contact holder extending between a front and a rear having contact channels extending between the front and the rear and first and second contacts received in the corresponding channels of the contact holder each having a mating end and a terminating end. A ground shield is coupled to the contact holder and provides electrical shielding for the first and second contacts. The cable assembly includes a cable having a cable core including a first signal conductor, a second signal conductor, a first insulator around the first signal conductor and a second insulator around the second signal conductor. The first and second signal conductors include exposed segments at an end of the cable extending forward of the first and second insulators, respectively for termination to the first and second contacts. The cable includes a cable shield surrounding the cable core providing electrical shielding along a length of the cable and having an exposed segment proximate to the end of the cable. A conductive film is wrapped around the exposed segment of the cable shield being electrically connected to the cable shield. A cable ferrule is coupled to the end of the cable being wrapped around the conductive film and being electrically connected to the conductive film. The cable ferrule is electrically connected to the cable shield through the conductive film and the ground shield is electrically connected to the cable ferrule rearward of the contact holder.

DETAILED DESCRIPTION OF THE INVENTION

Figure 2:
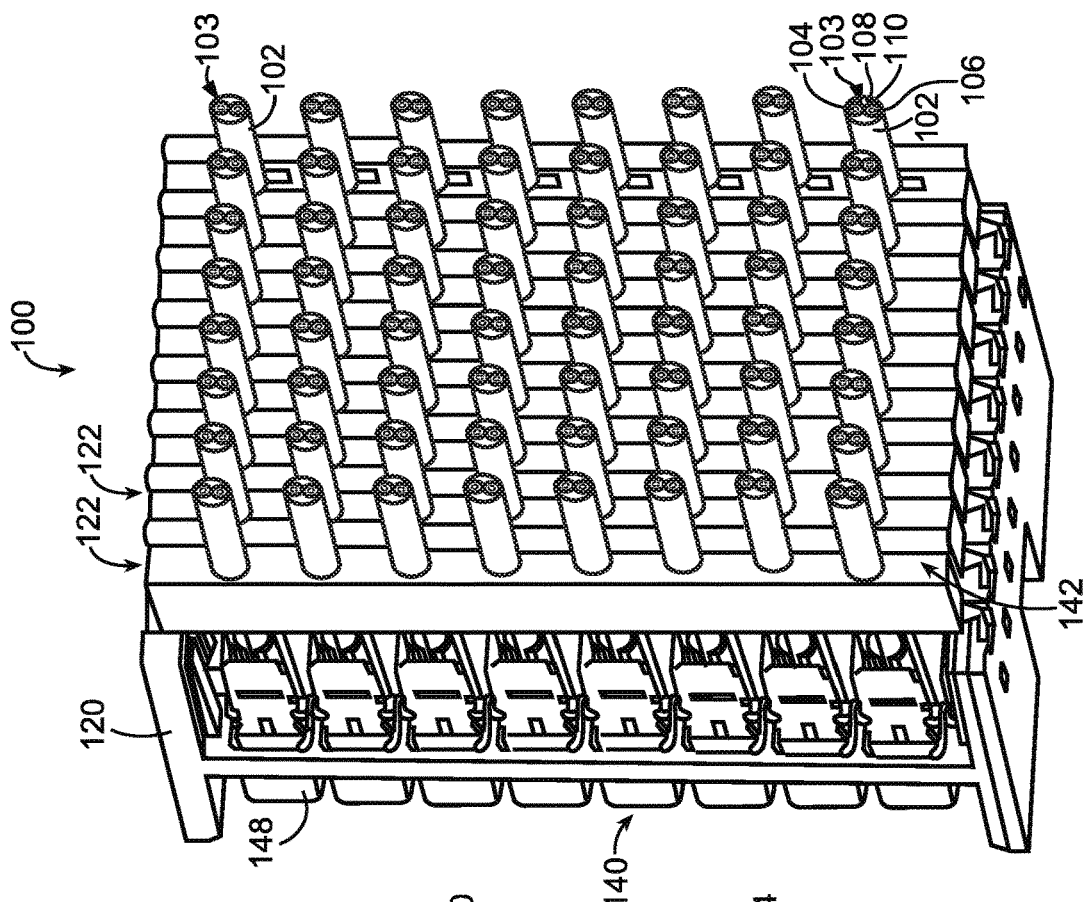
FIG. 2 is a rear perspective view of the electrical connector in accordance with an exemplary embodiment.
Figure 1:
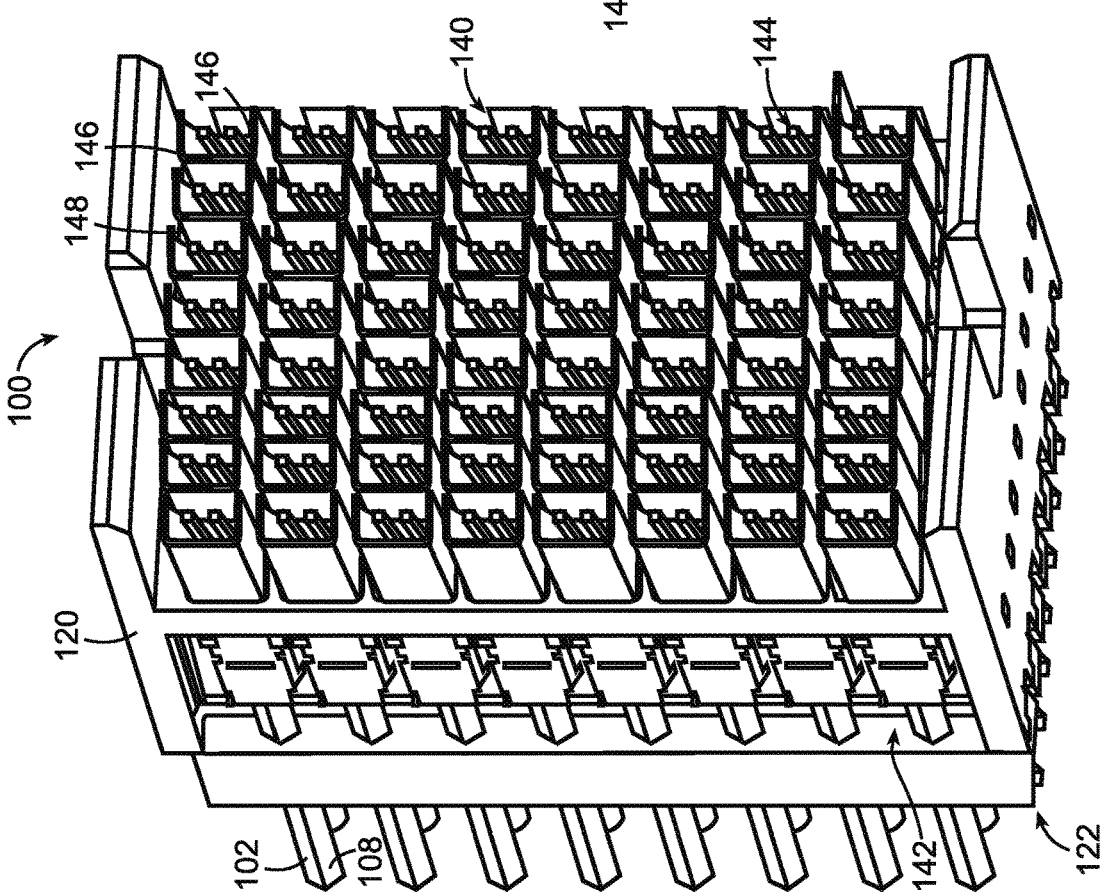
FIG. 1 is a front perspective view of an electrical connector in accordance with an exemplary embodiment.

FIG. 1 is a front perspective view of an electrical connector 100 formed in accordance with an exemplary embodiment. FIG. 2 is a rear perspective view of the electrical connector 100. In the illustrated embodiment, the electrical connector 100 is a cable header connector and may be referred to hereinafter as a cable header connector 100. The cable header connector 100 is configured to be mated with a mating electrical connector, such as a receptacle connector (not shown). The receptacle connector may be board mounted to a printed circuit board or terminated to one or more cables, for example. In an exemplary embodiment, the cable header connector 100 is a high speed differential pair cable connector that includes a plurality of differential pairs of conductors mated at a common mating interface. The differential conductors are shielded along the signal paths thereof to reduce noise, crosstalk and other interference along the signal paths of the differential pairs. The cable shielding and arrangement of conductors may control impedance of the cable header connector 100.

A plurality of cables 102 extend rearward of the cable header connector 100. In an exemplary embodiment, the cables 102 are twin-axial cables having a pair of signal conductors within a cable core 103. Other types of cables 102 may be provided in alternative embodiments. For example, coaxial cables each carrying a single signal conductor may extend from the cable header connector 100. In an exemplary embodiment, the cable 102 includes two signal conductors 104, 106 within the cable core 103. The two signal conductors 104, 106 are arranged within a common jacket or dielectric cover 108 of the cable 102. The signal conductors 104, 106 convey differential signals. The two signal conductors 104, 106 may be defined by separate signal wires each having a separate insulator and then arranged within the dielectric cover 108. Alternatively, the signal conductors 104, 106 may be co-extruded in a single insulator arranged within the dielectric cover 108.

Figure 4:
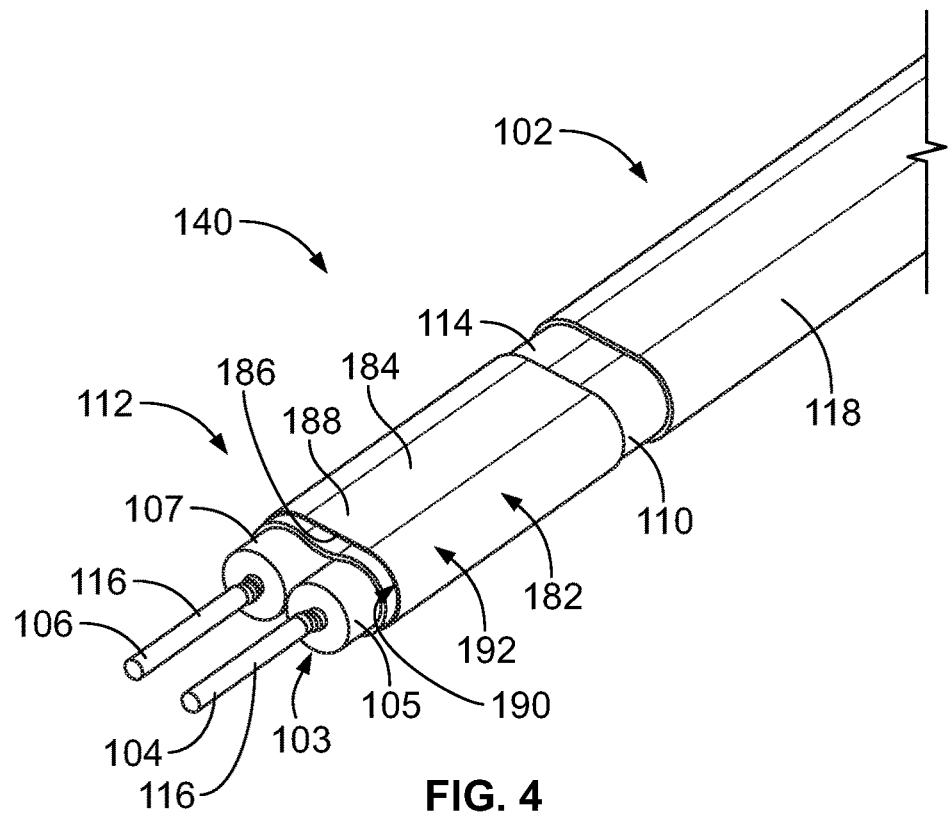
FIG. 4 is a top perspective view of a portion of a cable assembly in accordance with an exemplary embodiment showing a cable and a conductive film.

In an exemplary embodiment, the pair of signal conductors 104, 106 is shielded, such as with a cable shield 110 (shown in FIG. 4). The cable shield 110 defines a grounded element of the cable 102 forming part of a shield structure for the signal(s) of the cable 102. In various embodiments, the cable 102 is provided without a drain wire in the cable core 103, rather forming a symmetric cable core 103. However, alternative embodiments may include a drain wire electrically connected to the cable shield 110. The cable shield 110 of the cable 102 provides shielding for the signal conductors 104, 106 along the length of the cable 102 and may be electrically connected to other components, such as a ground shield for grounding connection to the mating electrical connector.

The cable header connector 100 includes a header housing 120 holding one or more contact modules 122. The contact modules 122 are loaded into the header housing 120, such as into a rear of the header housing 120. The header housing 120 holds the contact modules 122 in a stack with the contact modules 122 oriented parallel to each other such that the cable assemblies 140 are aligned in a column. Any number of contact modules 122 may be held by the header housing 120 depending on the particular application.

Each of the contact modules 122 includes a plurality of cable assemblies 140 held by a support body 142. Each cable assembly 140 includes a contact sub-assembly 144 configured to be terminated to a corresponding cable 102. The contact sub-assembly 144 includes a pair of signal contacts 146 terminated to corresponding signals conductors 104, 106. The cable assembly 140 also includes a ground shield 148 providing shielding for the signal contacts 146. In an exemplary embodiment, the ground shield 148 peripherally surrounds the signal contacts 146 along the entire length of the signal contacts 146 to ensure that the signal paths are electrically shielded from interference. The ground shield 148 is configured to be electrically coupled to one or more grounded components, such as the cable shield 110, of the corresponding cable 102. The ground shield 148 is configured to be electrically coupled to the support body 142 for additional shielding and grounding. The ground shield 148 is configured to be electrically coupled to corresponding grounded components of the receptacle assembly when mated thereto.

The support body 142 provides support for the contact sub-assembly 144 and ground shield 148. In an exemplary embodiment, the cables 102 extend along the support body 142 with the support body 142 supporting a length or portion of the cables 102. The support body 142 may provide strain relief for the cables 102.

Figure 3:
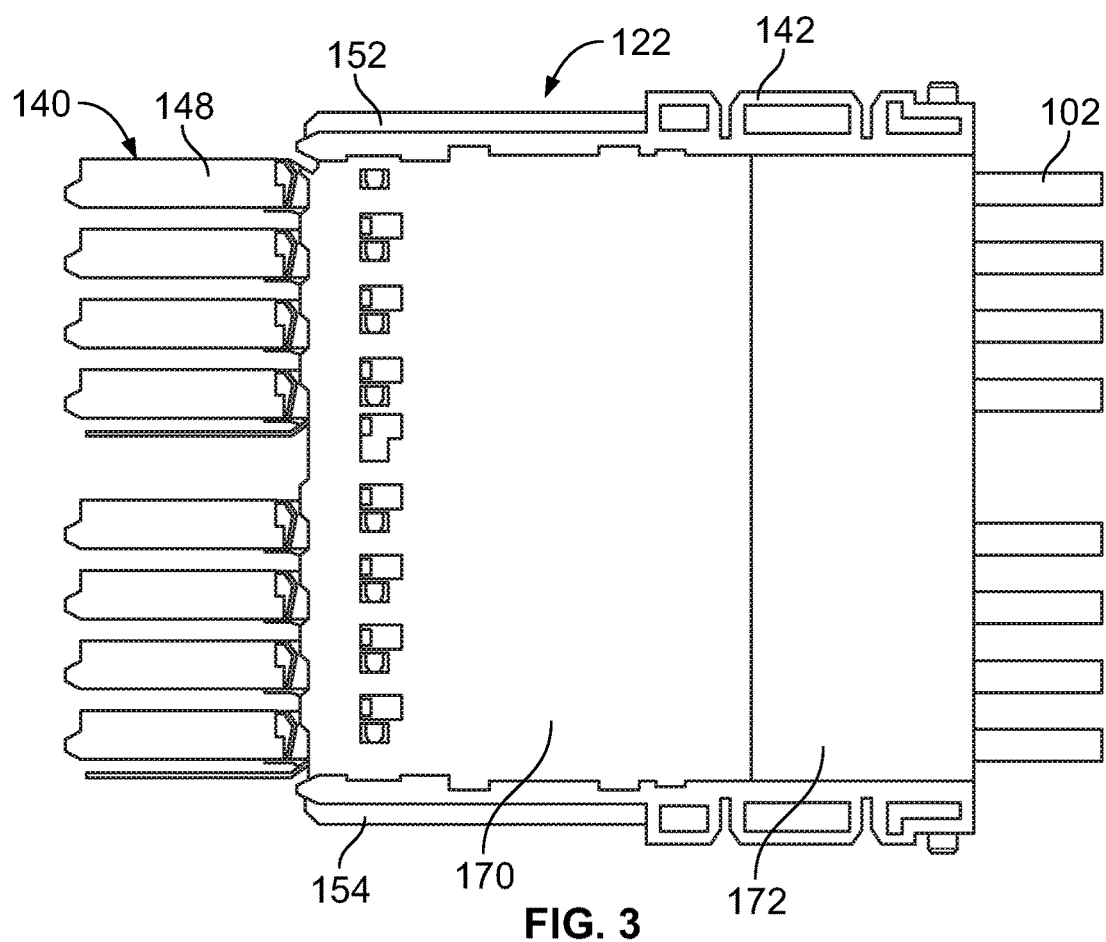
FIG. 3 is a side view of a contact module of the electrical connector in accordance with an exemplary embodiment.

FIG. 3 is a side view of one of the contact modules 122. In an exemplary embodiment, the contact module 122 includes latches 152, 154 that engage corresponding latch elements (e.g. channels) on the header housing 120 (shown in FIGS. 1 and 2) to secure the contact module 122 in the header housing 120. The latches 152, 154 may be integrally formed with the support body 142. Other types of latching features may be used in alternative embodiments to secure the contact module 122 to the header housing 120.

In the illustrated embodiment, the contact module 122 includes a shield member 170 and a cover 172 coupled to a first side and/or a second side of the support body 142. The support body 142 supports the cable assemblies 140 and/or the cables 102. The shield member 170 provides electrical shielding for the cable assemblies 140 and/or the cables 102. Optionally, the shield member 170 may electrically connect the ground shields 148 of the cable assemblies 140 together to electrically common the cable assemblies 140. The cover 172 is attached to the support body 142 and/or the shield member 170 and provides strain relief for the cables 102. In an exemplary embodiment, the cover 172 is a plastic cover. The cover 172 may be overmolded over portions of the cables 102, such as directly into the support body 142. The cover 172 may be attached to the cables 102 and/or the support body 142 by other means or processes in alternative embodiments. For example, the cover 172 may be premolded and attached to the side of the support body 142 over the cables 102. The cover 172 may be a hot melt material applied over the cables 102 to secure the cables 102 to the shield member 170. The cover 172 engages the cables 102 to provide strain relief for the cables 102.

The cable assemblies 140 are mounted to the support body 142, such as in channels or slots in the support body 142. The shield member 170 is coupled to the side of the support body 142 after the cable assemblies 140 are positioned in the support body 142. Alternatively, the cable assemblies 140 may be coupled to the shield member 170 and then loaded into the support body 142 with the shield member 170. In an exemplary embodiment, the ground shields 148 are coupled directly to the shield member 170, such as using tabs, press-fit pins or other features such as latches, clips, fasteners, solder, and the like. In alternative embodiments, the ground shields 148, or portions of the ground shields 148 may be integral with the shield member 170, such as being stamped and formed from the metal holder.

In an exemplary embodiment, a cable ferrule 180 (shown in FIG. 5) is coupled to an end of the cable 102. The cable ferrule 180 is electrically connected to one or more grounded elements of the cable 102, such as the cable shield 110 (shown in FIG. 4). The ground shield 148 and/or the shield member 170 may be electrically connected to the cable ferrule 180 to create a ground path or grounded connection to the cable 102. In an exemplary embodiment, a conductive film 182 (shown in FIG. 4) is provided between the cable shield 110 and the cable ferrule 180 to mechanically and electrically connect the cable ferrule 180 to the cable shield 110.

Figure 5:
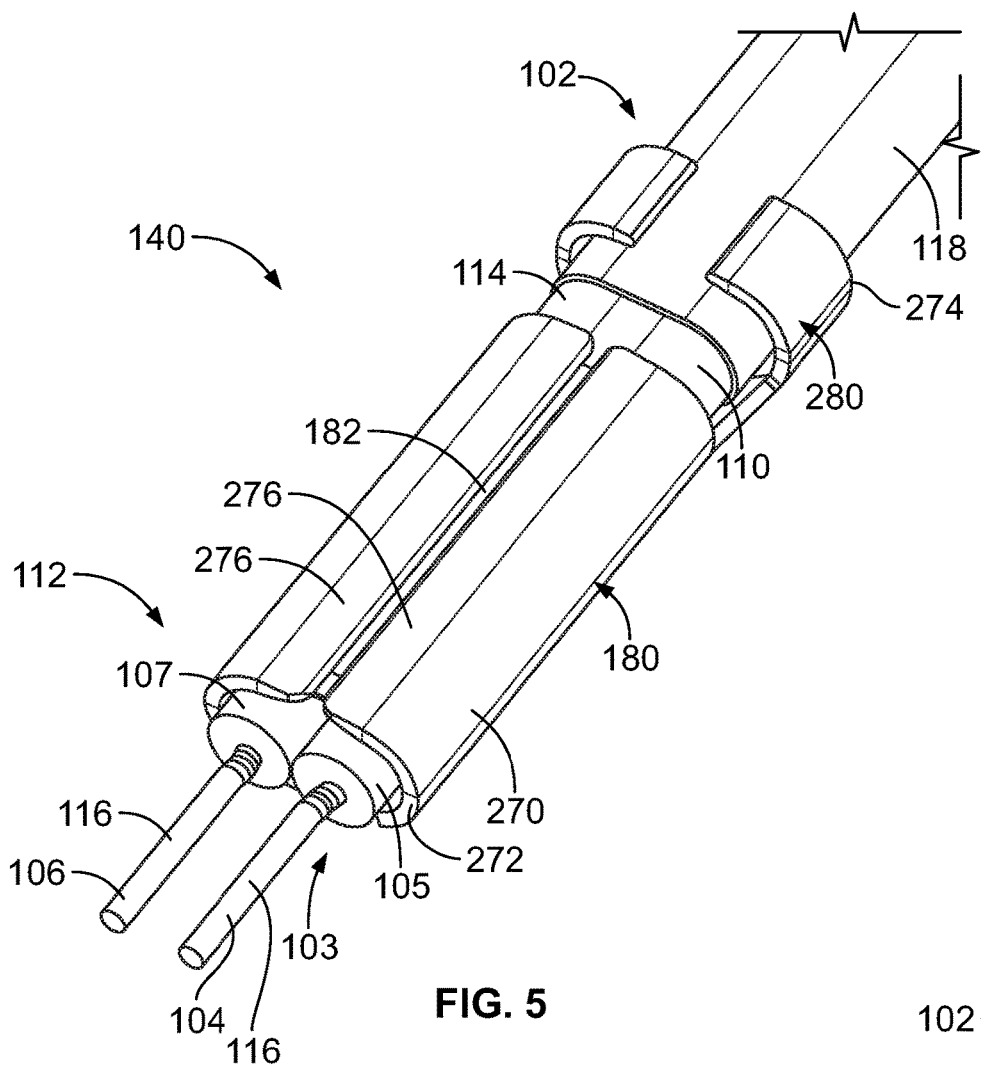
FIG. 5 is a top perspective view of a portion of the cable assembly showing a ferrule coupled to the conductive film in accordance with an exemplary embodiment.

FIG. 4 is a top perspective view of a portion of the cable assembly 140 showing the cable 102 with the conductive film 182 in accordance with an exemplary embodiment. FIG. 5 is a top perspective view of a portion of the cable assembly 140 showing the ferrule 180 coupled to the cable 102 in accordance with an exemplary embodiment.

In the illustrated embodiment, the cable core 103 includes the first signal conductor 104 and the second signal conductor 106; however, it is realized that the cable core 103 may include greater or fewer signal conductors in alternative embodiments. The cable core 103 includes a first insulator 105 around the first signal conductor 104 and a second insulator 107 around the second signal conductor 106. In various embodiments, the signal conductors 104, 106 and the corresponding insulators 105, 107 may be defined by separate insulated wires that are surrounded by the cable shield 110 and the dielectric cover 118. In other various embodiments, the first and second insulators 105, 107 may be formed from a single insulator member (dual extrusion insulator including the first insulator 105 around the first signal conductors 104 and the second insulator 107 around the second signal conductor 106) that surrounds both the signal conductors 104, 106. For example, the single insulator member may be extruded with the first and second signal conductors 104, 106 such that the first and second insulators 105, 107 are formed from an integral, unitary or monolithic insulator body.

The cable shield 110 surrounds the cable core 103 and provides electrical shielding along the length of the cable 102. The dielectric cover 118 surrounds the cable shield 110 along the length of the cable 102 and provides environmental protection for the cable shield 110. The cable shield 110 and/or the dielectric cover 118 may be extruded with the cable core 103 during a cabling process. In other various embodiments, the cable shield 110 may be wrapped around the cable core 103 and include a longitudinal seam along the length of the cable 102, such as where the first end wraps around the second end of the cable shield 110. In other various embodiments, the cable shield 110 may be helically wrapped around the cable core 103.

In an exemplary embodiment, an end 112 of the cable 102 is prepared for termination to signal contacts 146 (shown in FIG. 1) and the ferrule 180. For example, a portion of the dielectric cover 118 may be stripped and removed leaving an exposed segment 114 of the cable shield 110 at the end 112 of the cable 102. The cable shield 110 may conform to the shape of the cable core 103, such as the shape of the insulators 105, 107. For example, because the cable 102 is provided without a drain wire, the cable shield 110 is able to conform to the outer surfaces of the insulators 105, 107 to orient the cable shielding a uniform and consistent distance from the signal conductors 104, 106 to control impedance of the signals transmitted by the cable 102.

The conductive film 182 is configured to be coupled to the exposed segment 114 of the cable shield 110. The conductive film 182 is separate and discrete from the cable shield 110 and coupled thereto. For example, the cable shield 110 may extend the length of the cable as being part of the cable 102 (for example, manufactured, such as extruded, with the cable 102), whereas the conductive film 182 is a separate component coupled to the cable shield 110 to provide in interface between the cable shield 110 and the ground shield 148.

Optionally, the conductive film 182 may be wrapped entirely around the exposed segment 114 of the cable shield 110. In alternative embodiments, the conductive film 182 may be partially wrapped around the exposed segment 114, such as along the top and/or the bottom and/or a first side and/or a second side of the cable 102. Optionally, multiple conductive films 182 may be provided and separately coupled to the cable shield 110. For example, the multiple conductive films 182 may be strips applied to the top and/or the bottom and/or the first side and/or the second side of the cable 102.

In an exemplary embodiment, a portion of the cable shield 110 is stripped and removed exposing the cable core 103. For example, ends of the insulators 105, 107 may be exposed beyond the end of the cable shield 110. Portions of the insulators 105, 107 may be stripped and removed leaving exposed segments 116 of the signal conductors 104, 106 at the end 112 of the cable 102. The exposed segments 116 are configured to be terminated to the signal contacts 146.

In an exemplary embodiment, the conductive film 182 includes a film member 184 having an interior 186 that faces the cable shield 110 and an exterior 188 opposite the interior 186. The film member 184 is electrically conductive. The film member 184 may be a metal sheet or foil. In other various embodiments, the film member 184 may be formed from conductive fibers held together to form a conductive film. In an exemplary embodiment, the conductive film 182 includes an interior conductive adhesive layer 190 along the interior 186 for mechanically and electrically connecting the film member 184 to the cable shield 110. In an exemplary embodiment, the conductive film 182 includes an exterior conductive adhesive layer 192 along the exterior 188 for mechanically and electrically connecting the film member 184 to the ferrule 180. The conductive film 182 may be compressible in various embodiments. Optionally, the conductive film 182 may have a seam, such as where the first end of the film member 184 wraps around the second end of the film member 184.

In an exemplary embodiment, the conductive film 182 is electrically coupled to the cable shield 110 by a solderless connection and the conductive film 182 is electrically connected to the cable ferrule 180 by a solderless connection. For example, the adhesive of the adhesive layers 190, 192 may be used to mechanically and electrically connect the conductive film 182 to the cable shield 110 and the ferrule 180. In an exemplary embodiment, the conductive film 182 is coupled to the cable shield 110 prior to coupling the ferrule 180 to the conductive film 182. In alternative embodiments, the conductive film 182 is coupled to the ferrule 180 and applied to the cable shield 110 with the ferrule 180, such as during crimping of the ferrule 180 to the cable 102.

During assembly, the ferrule 180 is coupled to the end 112 of the cable 102. The cable ferrule 180 includes a ferrule body 270 configured to engage and be electrically connected to a grounded element of the cable 102. For example, the ferrule body 270 may engage and be electrically connected to the conductive film 182, which is electrically connected to the cable shield 110 to electrically connect the ferrule 180 to the cable shield 110. The ferrule 180 is configured to engage and be electrically connected to the ground shield 148 (shown in FIG. 1). For example, the ferrule body 270 may be laser welded to the ground shield 148 after the cable assembly 140 is assembled or may be electrically connected by an interference fit.

The ferrule body 270 extends between a front 272 and a rear 274. In an exemplary embodiment, the ferrule 180 includes one or more ground tabs 276 at the front 272. The ground tabs 276 are configured to engage a grounded component of the cable 102, such as the conductive film 182. The ground tabs 276 directly engage the conductive film 182 for direct electrical connection thereto, which electrically connects the ferrule 180 to the cable shield 110 through the conductive film 182. In an exemplary embodiment, the ground tabs 276 are formed around the conductive film 182, such as being bent around the conductive film 182 and/or the cable shield 110. For example, the ground tabs 276 of the ferrule 180 may be crimped around the conductive film 182. In an exemplary embodiment, the crimping may be a loose crimping where the ground tabs 276 do not detrimentally alter the shape of the cable shield 110 and/or the cable core 103. As such, the cable shield 110 remains symmetrically surrounding the signal conductors 104, 106 without negatively affecting the impedance of the signal conductors 104, 106. In other words, the crimping of the ground tabs 276 does not crush or detrimentally compress the cable shield 110 inward to change the spacing between the cable shield 110 and the signal conductors 104, 106. The crimping may impart a slight compression against the conductive film 182 and/or the cable shield 110 to mechanically position the ferrule 180 on the cable 102. In various embodiments, adhesive from the conductive film 182 may be used to hold the relative position of the ferrule 180 on the cable 102. The adhesive may mechanically connect the ferrule 180 to the conductive film 182 without the need for a compressive crimp of the ferrule 180. Optionally, the ground tabs 276 may be laser welded together at a seam where the ground tabs 276 meet.

In an exemplary embodiment, the ferrule 180 includes a crimp barrel 280 at the rear 274. The crimp barrel 280 is configured to be crimped to the dielectric cover 118 of the cable 102. The crimp barrel 280 may provide strain relief for the cable 102.

Figure 6:
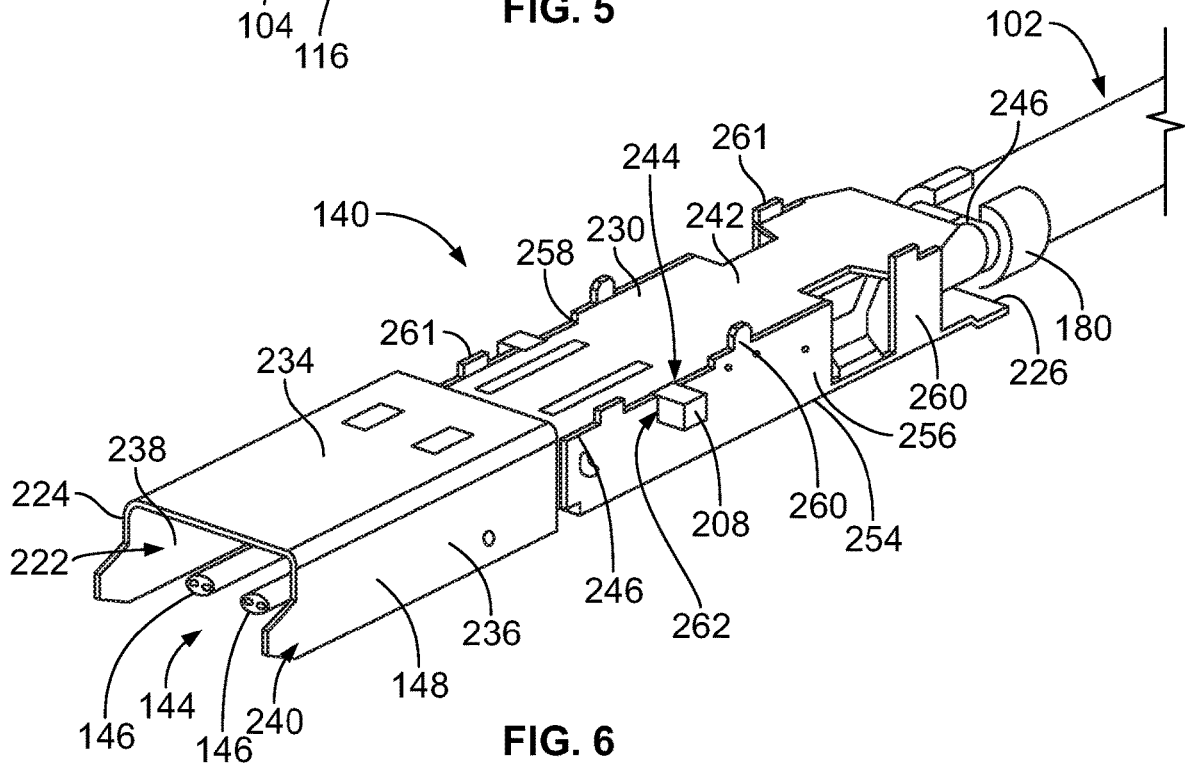
FIG. 6 is a front perspective view of the cable assembly in accordance with an exemplary embodiment.
Figure 7:
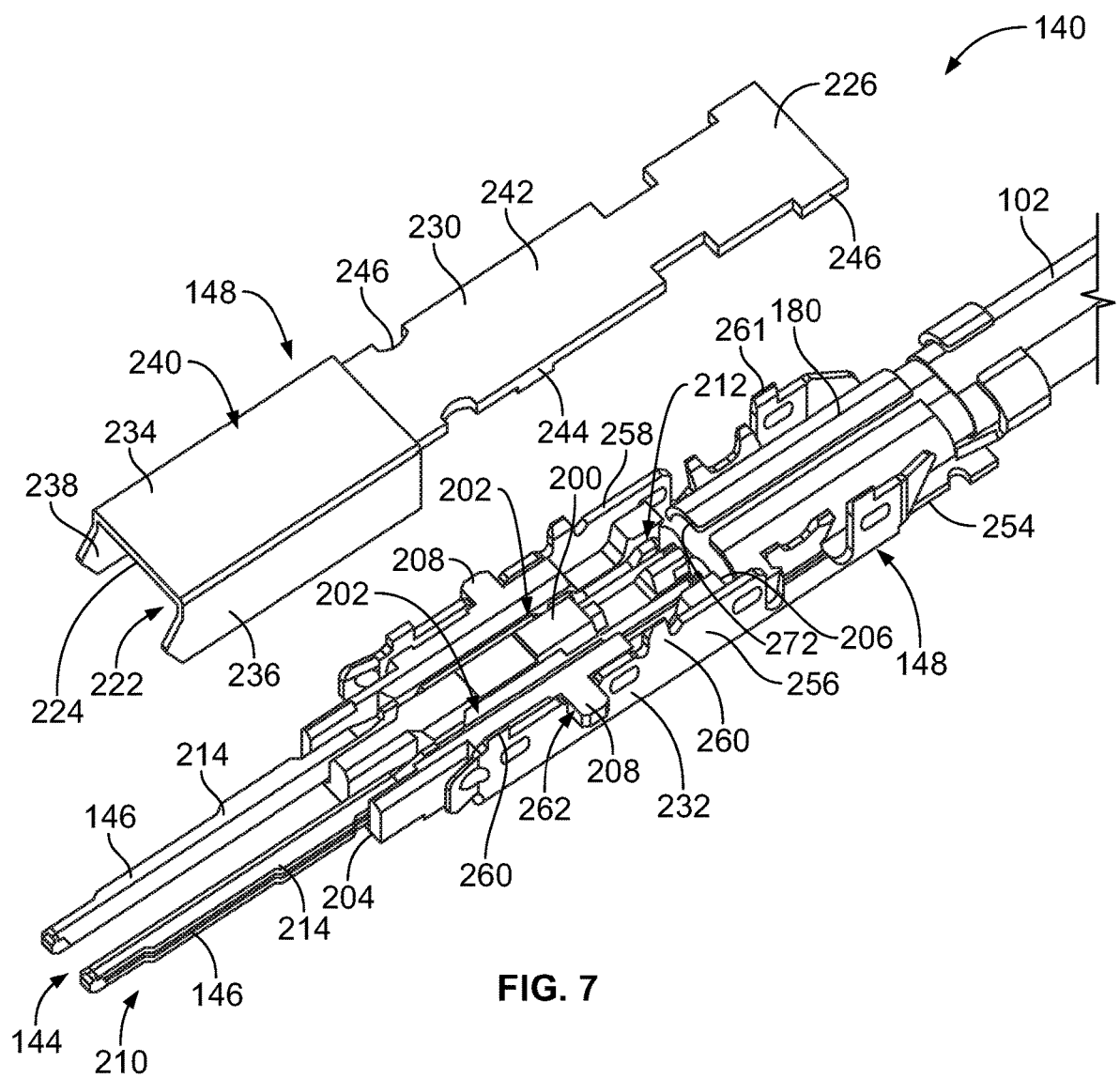
FIG. 7 is a partially exploded view of the cable assembly illustrating a ground shield.

FIG. 6 is a front perspective view of one of the cable assemblies 140 in accordance with an exemplary embodiment. FIG. 7 is a partially exploded view of the cable assembly 140 illustrating the ground shield 148 poised for coupling to the contact sub-assembly 144. The contact sub-assembly 144 includes a contact holder 200 that holds the first and second signal contacts 146 and the corresponding first and second signal conductors 104, 106 (shown in FIG. 2). The contact holder 200 includes contact channels 202 that receive corresponding signal contacts 146 therein. The first and second contact channels 202 are generally open at a top of the contact holder 200 to receive the signal contacts 146 therein, but may have other configurations in alternative embodiments. The contact holder 200 includes features to secure the signal contacts 146 in the contact channels 202. For example, the signal contacts 146 may be held by an interference fit in the contact channels 202. The contact holder 200 is manufactured from a dielectric material and electrically isolates the signal contacts 146 from each other. The contact holder 200 and contact channels 202 are designed for impedance control of the signal contacts 146, with design consideration given to the shape of the signal contacts 146, the spacing of the signal contacts 146 and the dielectric characteristics of the material and/or air gaps between the signal contacts 146 and/or the ground shield 148.

The contact holder 200 is positioned forward of the cable 102. The signal conductors 104, 106 extend into the contact holder 200 for termination to the signal contacts 146. The contact holder 200 is shaped to guide or position the signal conductors 104, 106 therein for termination to the signal contacts 146. In an exemplary embodiment, the signal conductors 104, 106 are terminated to the signal contacts 146 in-situ after being loaded into the contact holder 200. In an exemplary embodiment, the contact holder 200 positions the signal contacts 146 and signal conductors 104, 106 in direct physical engagement for laser welding. The signal conductors 104, 106 and signal contacts 146 are precisely held by the contact holder 200 for automated or manual laser welding. Alternatively, the signal contacts 146 may be terminated to the signal conductors 104, 106, such as by crimping to the signal conductors 104, 106, and then loading the signal contacts 146 into the contact holder 200.

The contact holder 200 extends between a front 204 and a rear 206. In an exemplary embodiment, the signal contacts 146 extend forward from the contact holder 200 beyond the front 204. The contact holder 200 includes locating posts 208 extending from opposite sides of the contact holder 200. The locating posts 208 are configured to position the contact holder 200 with respect to the ground shield 148 when the ground shield 148 is coupled to the contact holder 200 and/or the support body 142 when the cable assembly 140 is coupled to the support body 142.

The signal contacts 146 extend between mating ends 210 and terminating ends 212 (shown in FIG. 6). The signal contacts 146 are terminated to corresponding signal conductors 104, 106 of the cable 102 at the terminating ends 212. For example, the terminating ends 212 may be laser welded to exposed portions of the conductors of the signal conductors 104, 106. Alternatively, the terminating ends 212 may be terminated by other means or processes, such as by soldering the terminating ends 212 to the signal conductors 104, 106, by crimping the terminating ends 212 to the signal conductors 104, 106, by using insulation displacement contacts, or by other means. The signal contacts 146 may be stamped and formed or may be manufactured by other processes.

In an exemplary embodiment, the signal contacts 146 have pins 214 at the mating ends 210. The pins 214 extend forward from the front 204 of the contact holder 200. The pins 214 are configured to be mated with corresponding receptacle contacts (not shown) of the receptacle connector (not shown). The pins 214 may be held in the contact holder 200 by an interference fit.

The ground shield 148 has a plurality of walls that define a chamber 222 that receives the contact sub-assembly 144. The ground shield 148 extends between a mating end 224 and a terminating end 226. The mating end 224 is configured to be mated with the receptacle connector. The terminating end 226 is configured to be electrically connected to the cable ferrule 180 and/or the cable 102. The front 272 (FIG. 7) of the cable ferrule 180 is positioned immediately rearward of the contact holder 200. Optionally, the front 272 may abut against the contact holder 200. The mating end 224 of the ground shield 148 is positioned either at or beyond the mating ends 210 of the signal contacts 146 when the cable assembly 140 is assembled. The terminating end 226 of the ground shield 148 is positioned either at or beyond the terminating ends 212 of the signal contacts 146. The ground shield 148 provides shielding along the entire length of the signal contacts 146. In an exemplary embodiment, the ground shield 148 provides shielding beyond the signal contacts 146, such as rearward of the terminating ends 212 and/or forward of the mating ends 210. The ground shield 148, when coupled to the contact sub-assembly 144, peripherally surrounds the pair of signal contacts 146. Because the ground shield 148 extends rearward beyond the terminating ends 212 of the signal contacts 146, the termination between the signal contacts 146 and the signal conductors 104, 106 is peripherally surrounded by the ground shield 148. In an exemplary embodiment, the ground shield 148 extends along at least a portion of the cable 102 to ensure that all sections of the signal conductors 104, 106 are shielded.

The ground shield 148 includes an upper shield 230 and a lower shield 232. The chamber 222 is defined between the upper and lower shields 230, 232. The contact sub-assembly 144 is positioned between the upper shield 230 and the lower shield 232.

In an exemplary embodiment, the upper shield 230 includes an upper wall 234 and side walls 236, 238 extending from the upper wall 234. The upper shield 230 includes a shroud 240 at the mating end 224 and a tail 242 extending rearward from the shroud 240 to the terminating end 226. The tail 242 is defined by the upper wall 234. The shroud 240 is defined by the upper wall 234 and the side walls 236, 238. In an exemplary embodiment, the shroud 240 is C-shaped and has an open side along the bottom thereof. The shroud 240 is configured to peripherally surround the pins 214 of the signal contacts 146 on three sides thereof. The upper shield 230 may have different walls, components and shapes in alternative embodiments.

The tail 242 includes locating features 244 that are used to locate the upper shield 230 with respect to the contact holder 200 and/or the lower shield 232. In the illustrated embodiment, the locating features 244 are cut-outs that receive the locating posts 208 to locate the upper shield 230 with respect to the contact holder 200.

The upper shield 230 includes grounding features 246 used to connect the upper shield 230 to the lower shield 232. The grounding features 246 may be used to both mechanically and electrically connect the upper and lower shields 230, 232. In the illustrated embodiment, the grounding features 246 are tabs that are configured to be laser welded to the lower shield 232. Other types of grounding features 246 may be used in alternative embodiments. For example, press-fit pins, latches, spring beams, fasteners, clips and the like may be used to mechanically and/or electrically connect the upper shield 230 to the lower shield 232. Optionally, the tail 242 of the upper shield 230 may be connected to the ferrule 180. For example, the upper shield 230 may be laser welded to the ferrule 180, soldered to the ferrule 180 are electrically connected by an interference or spring engagement.

In an exemplary embodiment, the lower shield 232 includes a lower wall 254 and side walls 256, 258 extending upward from the lower wall 254. The lower shield 232 includes grounding features 260, 261 extending from the side walls 256, 258. The grounding features 260 are configured to engage the upper shield 230, such as the grounding features 246 of the upper shield 230 or other portions of the upper shield 230, to connect the lower shield 232 to the upper shield 230. In the illustrated embodiment, the grounding features 261 are compliant tabs that are configured to be biased against the ferrule 180 to ensure direct physical contact therewith. The grounding features 260 and/or 261 may be laser welded in-situ to mechanically and electrically connect the lower shield 232 to the upper shield 230 and/or the ferrule 180. Other types of grounding features may be used in alternative embodiments to connect the lower shield 232 to the upper shield 230 and/or the ferrule 180. For example, the lower shield 232 may be laser welded to the ferrule 180.

The lower shield 232 includes openings 262 in the side walls 256, 258. The openings 262 are configured to receive the locating posts 208 when the contact sub-assembly 144 is loaded into the ground shield 148. Other types of locating features may be used in alternative embodiments to position the contact sub-assembly 144 with respect to the ground shield 148 and/or to hold the axial position of the contact sub-assembly 144 with respect to the ground shield 148.

During assembly, the ground shield 148 is electrically coupled to the ferrule 180. The lower shield 232 is mechanically and electrically coupled to the upper shield 230, such as by laser welding the lower shield 232 to the upper shield 230. When assembled, the locating posts 208 are received in the openings 262 in the lower shield 232 and/or the locating features 244 of the upper shield 230 to secure the axial position of the contact sub-assembly 144 with respect to the ground shield 148. The cable ferrule 180 and a portion of the cable 102 are also received in the chamber 222. The ground shield 148 provides peripheral shielding around the cable ferrule 180 and the cable 102. The ground shield 148 provides electrical shielding for the signal contacts 146.

Figure 8:
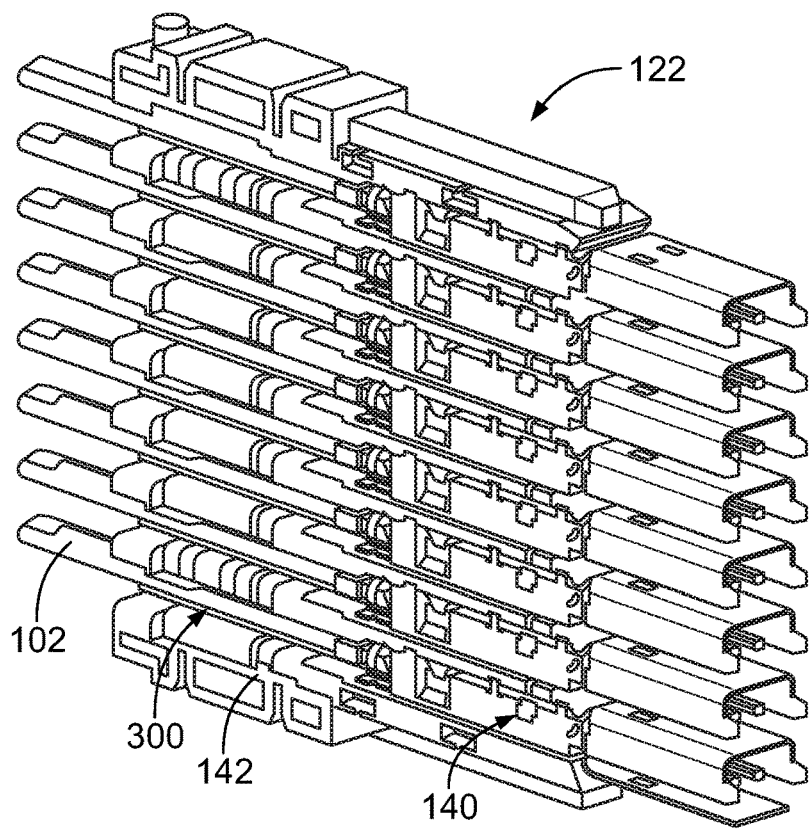
FIG. 8 is a front perspective view of a portion of the contact module in accordance with an exemplary embodiment.
Figure 9:
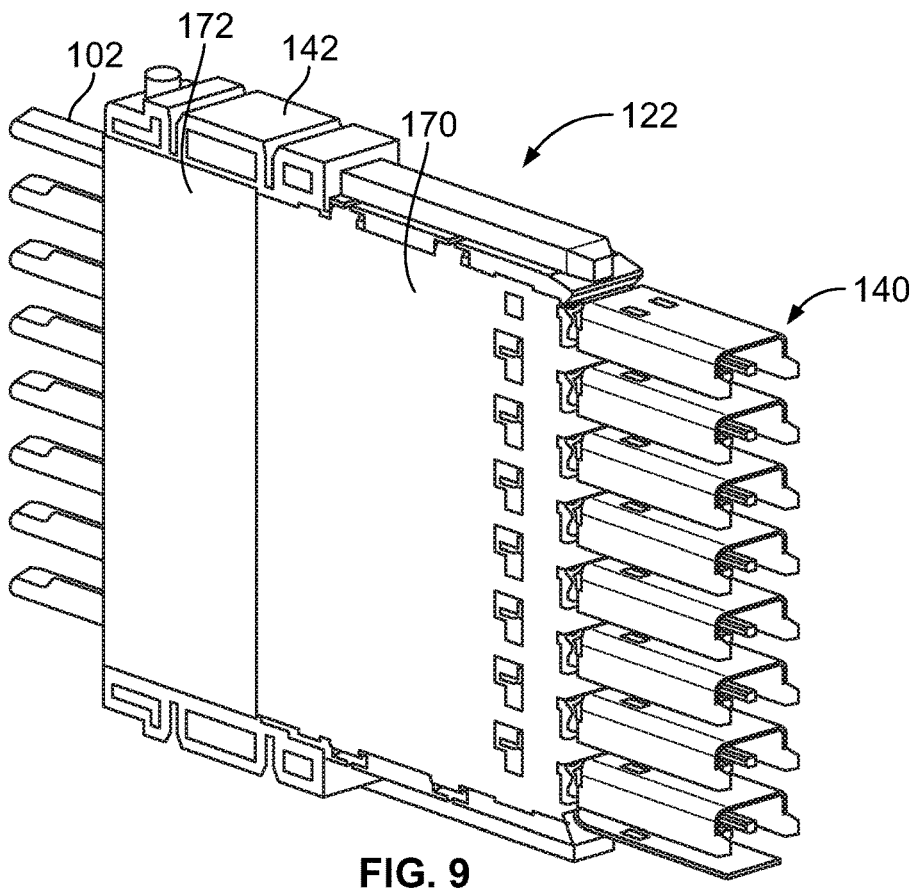
FIG. 9 is a front perspective view of the contact module in accordance with an exemplary embodiment.

FIG. 8 is a front perspective view of a portion of the contact module 122 in accordance with an exemplary embodiment. FIG. 9 is a front perspective view of the contact module 122 in accordance with an exemplary embodiment. During assembly, the cable assemblies 140 are loaded into channels 300 (FIG. 8) in the support body 142. The shield members 170 are coupled to the first side and/or the second side of the support body 142. The covers 118 are provided, such as by overmolding the support body 142 to close the channels 300 and provide strain relief for the cables 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable assembly comprising:
a cable having a cable core including a first signal conductor and a first insulator around the first signal conductor, wherein the first signal conductor includes an exposed segment at an end of the cable extending forward of the first insulator, the cable having a cable shield surrounding the cable core, the cable shield providing electrical shielding along a length of the cable, the cable shield having an exposed segment proximate to the end of the cable;
a conductive film applied directly to the exposed segment of the cable shield and conforming to the cable shield, the conductive film being electrically connected to the cable shield; and
a cable ferrule coupled to the end of the cable, the cable ferrule being mechanically coupled to the conductive film and being electrically connected to the conductive film;
wherein the conductive film includes a film member having an interior facing the cable shield and an exterior facing the cable ferrule, the film member being wrapped around the cable such that at least one of the interior or the exterior is adhered to the cable shield or the ferrule, the cable ferrule is electrically connected to the cable shield through the conductive film.

2. The cable assembly of claim 1, wherein the conductive film is electrically coupled to the cable shield by a solderless connection and the conductive film is electrically connected to the cable ferrule by a solderless connection.

3. The cable assembly of claim 1, wherein the conductive film includes a film member, the film member being electrically conductive and being electrically connected to the cable shield.

4. The cable assembly of claim 1, wherein the conductive film is separate and discrete from the cable shield and applied thereto to electrically connect the cable shield and the cable ferrule.

5. The cable assembly of claim 1, wherein the cable includes a second signal conductor and a second insulator around the second signal conductor within the cable core, the first and second signal conductors conveying differential signals, the cable shield being wrapped around the first insulator and the second insulator of the cable core.

6. The cable assembly of claim 5, wherein the cable shield conforms to the first insulator and the second insulator around the cable core.

7. The cable assembly of claim 1, wherein the conductive film is secured to the cable ferrule prior to coupling the conductive film to the cable shield.

8. The cable assembly of claim 1, wherein the cable ferrule is crimped to the cable around the conductive film and the cable shield.

9. The cable assembly of claim 1, wherein the cable includes a dielectric cover covering the cable shield along the length of the cable, the exposed segment of the cable shield extending forward of the dielectric cover, the cable ferrule being secured to the dielectric cover.

10. The cable assembly of claim 1, wherein the cable ferrule includes a first ground tab wrapped around a first side of the cable shield and a second ground tab wrapped around a second side of the cable shield.

11. The cable assembly of claim 1, wherein the cable includes a second signal conductor and a second insulator around the second signal conductor within the cable core, the cable assembly further comprising:
a contact holder holding first and second contacts terminated to the first and second signal conductors, respectively; and
a ground shield coupled to the contact holder providing electrical shielding for the first and second contacts, the ground shield being electrically connected to the cable ferrule and extending forward of the cable ferrule.

12. The cable assembly of claim 1, wherein the conductive film includes a film member having a first end and a second end, the second end being wrapped around the first end at a seam.

13. A cable assembly comprising:
a contact holder extending between a front and a rear, the contact holder having contact channels extending between the front and the rear;
a first contact received in the corresponding channel of the contact holder, the first contact having a mating end and a terminating end;
a second contact received in the corresponding channel of the contact holder, the second contact having a mating end and a terminating end;
a ground shield coupled to the contact holder and providing electrical shielding for the first and second contacts;
a cable extending from the rear of the contact holder, the cable having a cable core including a first signal conductor, a second signal conductor, a first insulator around the first signal conductor and a second insulator around the second signal conductor, wherein the first and second signal conductors include exposed segments at an end of the cable extending forward of the first and second insulators, respectively, the exposed segment of the first signal conductor terminated to the terminating end of the first contact, the exposed segment of the second signal conductor terminated to the terminating end of the second contact, the cable having a cable shield surrounding the cable core, the cable shield providing electrical shielding along a length of the cable, the cable shield having an exposed segment proximate to the end of the cable;
a conductive film wrapped around the exposed segment of the cable shield, the conductive film being electrically connected to the cable shield; and
a cable ferrule coupled to the end of the cable, the cable ferrule having a first ground tab and a second ground tab, the first and second ground tabs being wrapped around the conductive film and being electrically connected to the conductive film, the first and second ground tabs of the cable ferrule being crimped to the cable around the conductive film and the cable shield;
wherein the cable ferrule is electrically connected to the cable shield through the conductive film and wherein the ground shield is electrically connected to the cable ferrule rearward of the contact holder.

14. The cable assembly of claim 13, wherein the conductive film is electrically coupled to the cable shield by a solderless connection and the conductive film is electrically connected to the cable ferrule by a solderless connection.

15. The cable assembly of claim 13, wherein the conductive film includes a film member, an interior conductive adhesive layer on an interior of the conductive film and an exterior conductive adhesive layer on an exterior of the film member, the film member being electrically conductive and being electrically connected to the cable shield, the interior conductive adhesive layer being mechanically and electrically connected to the cable shield, the exterior conductive adhesive layer being mechanically and electrically connected to the cable ferrule.

16. The cable assembly of claim 13, wherein the conductive film is separate and discrete from the cable shield and applied thereto to electrically connect the cable shield and the cable ferrule.

17. An electrical connector comprising:
a housing having a front and a rear; and
a plurality of cable assemblies coupled to the housing and extending from the rear of the housing, each cable assembly comprising:
a contact holder extending between a front and a rear, the contact holder having contact channels extending between the front and the rear, the contact holder being coupled to the housing;
a first contact received in the corresponding channel of the contact holder, the first contact having a mating end and a terminating end;
a second contact received in the corresponding channel of the contact holder, the second contact having a mating end and a terminating end;
a ground shield coupled to the contact holder and providing electrical shielding for the first and second contacts;
a cable extending from the rear of the contact holder, the cable having a cable core including a first signal conductor, a second signal conductor, a first insulator around the first signal conductor and a second insulator around the second signal conductor, wherein the first and second signal conductors include exposed segments at an end of the cable extending forward of the first and second insulators, respectively, the exposed segment of the first signal conductor terminated to the terminating end of the first contact, the exposed segment of the second signal conductor terminated to the terminating end of the second contact, the cable having a cable shield surrounding the cable core, the cable shield providing electrical shielding along a length of the cable, the cable shield having an exposed segment proximate to the end of the cable;
a conductive film including a film member wrapped around the exposed segment of the cable shield and conforming to the cable shield, the conductive film being electrically connected to the cable shield; and
a cable ferrule coupled to the end of the cable, the cable ferrule having a first ground tab and a second ground tab, the first and second ground tabs being wrapped around the conductive film and being electrically connected to the conductive film;
wherein the cable ferrule is electrically connected to the cable shield through the conductive film and wherein the ground shield is electrically connected to the cable ferrule rearward of the contact holder.

18. The electrical connector of claim 17, wherein the conductive film includes an interior conductive adhesive layer on an interior of the conductive film and an exterior conductive adhesive layer on an exterior of the film member, the film member being electrically conductive and being electrically connected to the cable shield, the interior conductive adhesive layer being mechanically and electrically connected to the cable shield, the exterior conductive adhesive layer being mechanically and electrically connected to the cable ferrule.

* * * * *